Feb. 17, 1970           S. J. HINKLE           3,495,766
METHOD AND MEANS FOR INCREASING THE MAXIMUM PRESSURE
RATIO OF A TURBINE DRIVEN CENTRIFUGAL COMPRESSOR
Filed Jan. 11, 1968

INVENTOR.
Stanley Joseph Hinkle
BY
Robert J. Outland
ATTORNEY

United States Patent Office 3,495,766
Patented Feb. 17, 1970

1

3,495,766
METHOD AND MEANS FOR INCREASING THE MAXIMUM PRESSURE RATIO OF A TURBINE DRIVEN CENTRIFUGAL COMPRESSOR
Stanley J. Hinkle, Farmington, Mich., assignor to General Motors Corporation, Detroit, Mich., a corporation of Delaware
Filed Jan. 11, 1968, Ser. No. 697,198
Int. Cl. F04b 49/00; F04d 27/00
U.S. Cl. 230—2        4 Claims

ABSTRACT OF THE DISCLOSURE

An air pumping system includes a turbine driven by engine exhaust gases having a predetermined maximum energy. The turbine drives a centrifugal air compressor which supplies compressed air for purposes such as unloading bulk carrying tanks. A connection between the compressor outlet and the turbine inlet diverts part of the compressor flow to the turbine at compressor ratios above a predetermined value. The diversion of flow increases turbine inlet energy and results in higher compressor speeds, permitting operation at increased pressure ratios without surge.

BACKGROUND OF THE INVENTION

This invention relates to fluid compressors and more particularly to a method and means for increasing the maximum pressure ratio of a centrifugal compressor driven by a fluid turbine connected with a source of pressure fluid having a predetermined maximum energy. More specifically, the invention involves a system for utilizing the exhaust energy of an internal combustion engine to provide a supply of compressed fresh air to a fluid receiver under varying pressure and flow conditions.

It is known in the art relating to unloading bulk containers, such as highway trailers, containing dry cement, grain, liquids and other commodities, to provide means for supplying compressed air to the bulk tank for unloading the bulk materials and transferring them through connecting lines to storage bins or tanks. While compressed air has been provided by many different devices, some of which have been driven by the engine which also powers the transport vehicle, there has been a need for a less expensive yet effective means for providing the necessary compressed air.

Proposals have been made to utilize a turbine driven centrifugal compressor of a type and size which is commercially produced for supercharging automotive vehicle engines. Attempts to use such arrangements have met with limited success but, at least in some instances, have not proven to provide a sufficient range of pressures and air flows to satisfy the requirements of varying bulk commodities. These requirements vary from the provision of relatively high air flow at low pressure to quickly unload certain of the light, dry bulk materials to the provision of relatively high pressure with low flow for pressurizing liquid tanks to discharge their contents.

Limitations on prior arrangements have resulted in part from the nature of centrifugal compressors and from the limited ability of internal combustion engines to operate at exhaust pressure energy levels above a predetermined maximum. The latter problem is of particular significance in two-cycle engines which rely on a scavenging blower for charging the cylinders, since the blower may have certain pressure and temperature limits beyond which it may not be operated. This results in a limited energy input to the turbine which drives the compressor and accordingly determines a normal maximum compressor speed. The speed of the compressor, in turn, determines the maximum pressure ratio (that is, relation of pressure output to input) at which the compressor may be operated without surge. Higher pressures could be obtained in a particular instance by utilizing a smaller compressor wheel but this would result in reduced flow at lower pressures. Thus, a particular system is limited as to the volume of flow possible and the maximum pressure which may be delivered by the compressor.

SUMMARY

The present invention provides a system of the type generally referred to above wherein the maximum output pressure of the compressor is increased without a reduction in the volume of flow delivered at lower pressures. This is accomplished by providing diversion means connecting the compressor outlet with the turbine inlet through which a portion of the compressor outlet flow may be diverted into the turbine inlet during conditions of high pressure operation. This diversion of flow increases the mass, and therefore the energy, of the gas supplied to the turbine, thereby increasing its operating speed. This, in turn, drives the compressor at a higher speed and raises the pressure ratio at which it can be operated without reaching the surge limit.

In this way, a reduced volume of air may be supplied, for unloading bulk containers or for other purposes, at a higher pressure than would otherwise be possible. On the other hand, when blower air pressures are satisfactory, the arrangement cuts off the diversion means so that a higher quantity of air flow is delivered at the lower pressure level.

These and other advantages of the invention will be more clearly understood from the following description of a preferred embodiment of the invention.

DESCRIPTION OF THE PREFERRED EMBODIMENT

Figure 1:
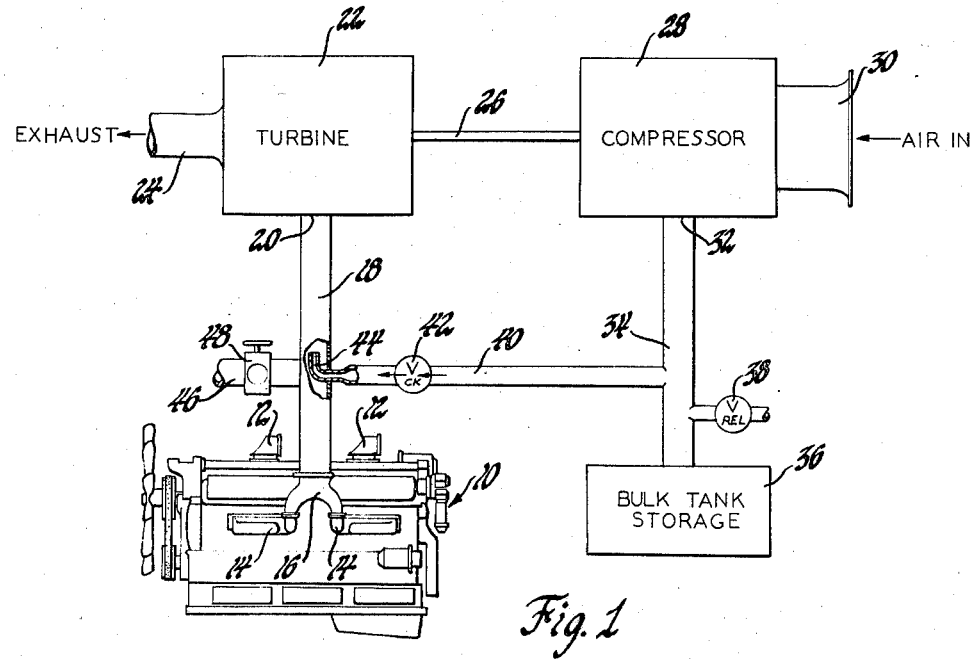
FIGURE 1 is a partially diagrammatic view of an engine equipped with compressed air supply means according to the invention and
FIGURE 2 is a compressor operation diagram indicating the relation of certain variable with and without the diversion of compressor output flow to the turbine.

Referring now more specifically to FIGURE 1 of the drawing, numeral 10 generally indicates an internal combustion engine of the two-cycle diesel type. Engine 10 includes a pair of air inlets 12 which are connected through scavenging blowers and engine cylinders (not shown) with a pair of exhaust outlets 14. Members 14 are connected through fitting 16 and conduit 18 with the inlet 20 of a fluid turbine 22 having an exhaust outlet 24.

The turbine 22 is connected through a shaft 26 with a centrifugal compressor 28 having an air inlet 30 and an outlet 32. The compressor outlet is connected through a conduit 34 with a bulk tank 36 for the purpose of unloading the contents thereof in a known manner. Conduit 34 also connects with a pressure relief valve 38 and with a diverting line 40 which connects the outlet 32 of the compressor to the inlet 20 of the turbine. The line 40 includes a check valve 42 which permits only unidirectional flow from the compressor outlet to the turbine inlet and a restricting nozzle 44 which limits flow through the line 40 and directs such flow toward the turbine inlet.

Exhaust conduit 18 also connects with the usual vehicle exhaust system represented by conduit 46. A shut-off valve 48 is located in the conduit to shut off flow to the exhaust system during operation of the air compressor system.

The operation of the system described above is as follows. During normal operation of the engine 10, such as to drive a vehicle, the cut-off valve 48 is open permitting exhaust from the engine to pass through conduit 46 and out through the usual exhaust system. When it is desired to unload a bulk tank, the system is connected to the tank 36 as shown in FIGURE 1 and the shut-off valve 48 is closed. The engine exhaust then passes through turbine 22, rotating the turbine which, in turn, drives compressor 28. The compressor draws in air through inlet 30 and exhausts it through conduit 34 to the bulk tank 36.

During this opertaion, the engine is normally operated at a fixed throttle setting which generates an exhaust pressure as close as possible to the maximum exhaust back pressure at which the charging blower of the engine may be safely operated without failure. This corresponds, for example, to a compressor pressure ratio of about 2 (a pressure of two atmospheres) as indicated by the broken line A of FIGURE 2.

If the bulk storage tank system does not severely restrict the flow of air from compressor 28, the compressor outlet pressure in line 34 will remain below the turbine inlet pressure in line 18 and the total output flow of the compressor will be delivered to the bulk tank for unloading purposes. None of the engine exhaust will pass into the bulk storage tank since check valve 42 prevents this.

Figure 2:
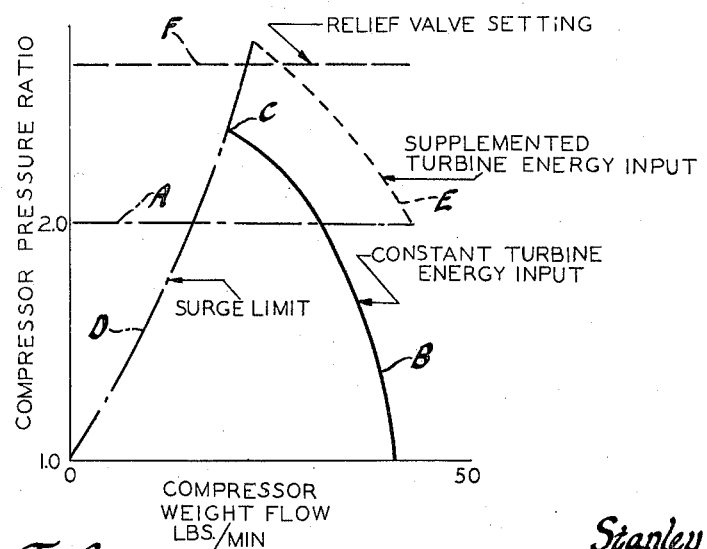

Thus with a constant energy input to the turbine, the weight of air passing through the compressor and into the bulk tank is represented by the solid line B of FIGURE 2. As this line indicates, the volume of flow through the compressor is highest without any back pressure and it drops off as the compressor outlet pressure increases up to a compressor ratio of 2 as shown by line A. If it were not for the diversion arrangement of line 40, further restriction of the compressor outlet would reduce the flow of air along the line B to its intersection at C with the surge limit indicated by broken line D, at which point, the maximum output pressure of the compressor would be reached.

However, with the system of the present invention, a restriction to flow through the bulk storage tank sufficient to raise the compressor outlet pressure above two atmospheres absolute pressure (a pressure ratio of 2), causes a diversion of flow from the compressor outlet through line 40, check valve 42 and nozzle 44 into line 18 and the inlet 20 of turbine 22. This diversion is restricted by nozzle 44 so as to permit a further increase in compressor outlet pressure.

The result of this diversion of flow is that a controlled mass of air is added to the exhaust gas being supplied by the engine to turbine 22. The nozzle 44 directs the flow in the direction of flow of exhaust gases to avoid increasing the back pressure on the engine. However, the additional mass of air increases the energy supplied to the turbine, increasing its speed and causing a like increase in the speed of the compressor 28. The increase in compressor speed moves the operating line of the compressor to the right as indicated by the dashed line E of FIGURE 2. As shown by this line, the higher compressor operating speed permits a substantially higher pressure to be reached in the compressor outlet before the surge limit indicated by line D is reached.

Since it is undesirable for the compressor to actually reach a condition of surge, relief valve 38 is provided to open and relieve excess pressure in the compressor outlet whenever the compressor pressure ratio reaches a predetermined maximum, indicated by broken line F of FIGURE 2.

Tests have indicated that the amount of increase in the maximum compressor pressure ratio which may be obtained by diversion of compressor outlet flow to the turbine inlet, will vary with the amount of flow diverted. Presumably, other factors of the system to which it is applied will also affect the results. However, for a particular system, it has been calculated that diversion of more than about 30% of the compressor outlet flow would not further increase the maximum pressure ratio since the cooling effect of the diverted gases, when mixed with the engine exhaust, tends to reduce turbine inlet energy rather than increase it. If desired, suitable valves or other control means could be utilized in the diversion line to adjust the flow to the optimum required for a particular application. It is believed, however, that proper design of the nozzle 44 or other restriction means would obviate the necessity for adjustable restrictions in a particular system.

I claim:
1. An engine driven air supply system adapted to supply compressed air at varying pressures and comprises the combination of
   an internal combustion engine having an exhaust system capable of supplying exhaust gas at a predetermined maximum pressure energy level,
   a fluid turbine having an inlet connected to said engine exhaust system and adapted to be driven by said exhaust gas,
   a centrifugal compressor drivingly connected to said turbine and having an outlet, said compressor being adapted to take in ambient air and deliver it at higher pressure through said outlet,
   air receiving means separate from said engine and connected with the compressor outlet to receive compressed air therefrom, said air receiving means comprising any of a plurality of bulk containers having provision for receiving compressed air for unloading and offering varying degrees of resistance to air flow therethrough whereby, at least under some circumstances, to cause an excessive pressure ratio across the compressor when operating at a speed determined by driving said turbine solely by exhaust gas from said engine and
   diverting means connecting and open to flow at all times from said compressor outlet to said turbine inlet and operable when the compressor outlet pressure is higher than the turbine inlet pressure to divert a portion of the compressed air flow from said compressor outlet to said turbine inlet whereby to increase turbine energy input above that obtainable solely from said engine exhaust and thereby increase compressor speed so as to permit operation at higher compressor ratios without surge,
   said diverting means including restriction means limiting the amount of flow diverted so as to allow compressor output presures to rise substantially higher than the pressure permitted at the turbine inlet.

2. The system of claim 1 wherein said diverting means is arranged to direct flow generally along the path of exhaust flow into the turbine inlet to avoid increasing the exhaust back pressure on the engine.

3. The system of claim 2 wherein said diverting means includes one-way valve means to prevent flow from the turbine inlet to the compressor outlet.

4. The system of claim 3 wherein said engine is a two-cycle engine having a scavenging blower with predetermined output limits of pressure and temperature for the cylinder air supply which limit the maximum obtainable engine exhaust gas energy level.

References Cited

UNITED STATES PATENTS

| | | | |
|---|---|---|---|
| 1,154,959 | 9/1915 | Banner | 230—115 |
| 2,096,883 | 10/1937 | Clason | 230—115 |
| 2,322,338 | 6/1943 | Baumann | 230—115 |
| 2,559,623 | 7/1951 | Holmes | 230—115 |
| 2,625,797 | 1/1953 | Poort et al. | 103—5 |
| 2,630,069 | 3/1953 | Harris | 103—5 |

WILLIAM L. FREEH, Primary Examiner

U.S. Cl. X.R.

230—114